Nov. 6, 1962 W. K. DOW 3,061,934
FLUSH PIN GAGE AND ADAPTER THEREFOR
Filed May 22, 1959 2 Sheets-Sheet 1
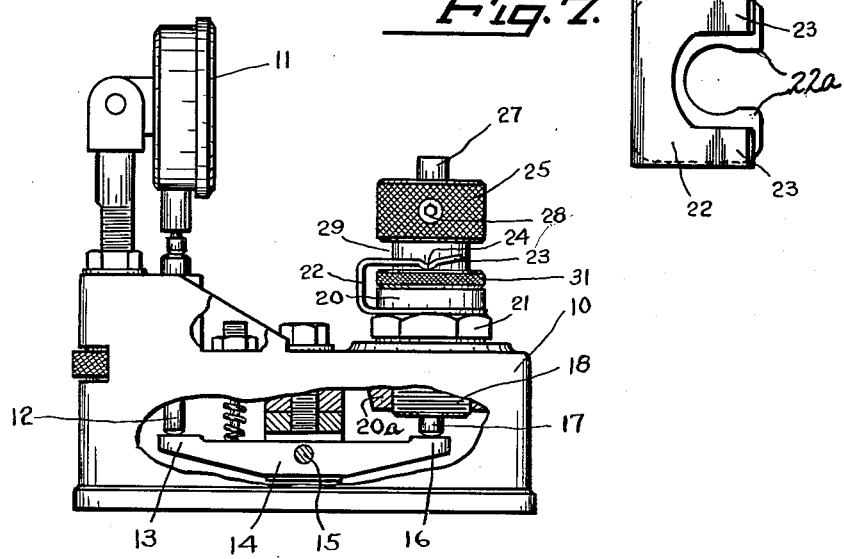
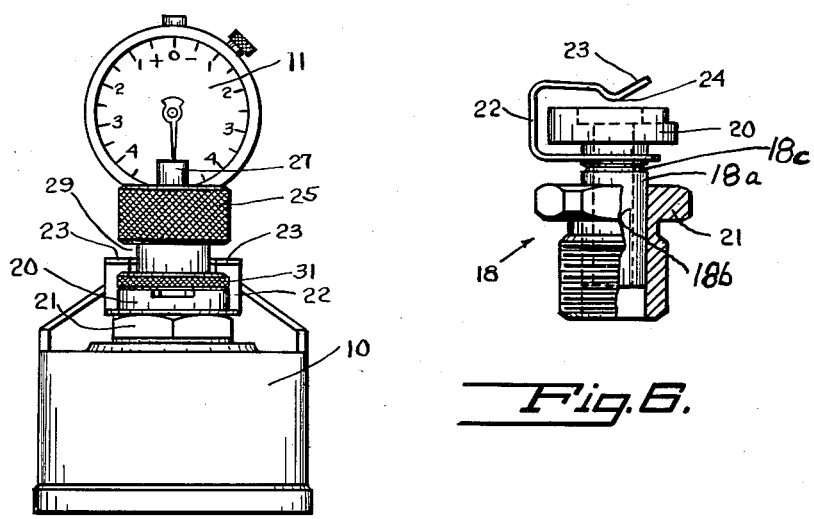
INVENTOR.
WALTER K. DOW
BY
Raymond A. Paquin
ATTORNEY.

Nov. 6, 1962  W. K. DOW  3,061,934
FLUSH PIN GAGE AND ADAPTER THEREFOR
Filed May 22, 1959  2 Sheets-Sheet 2
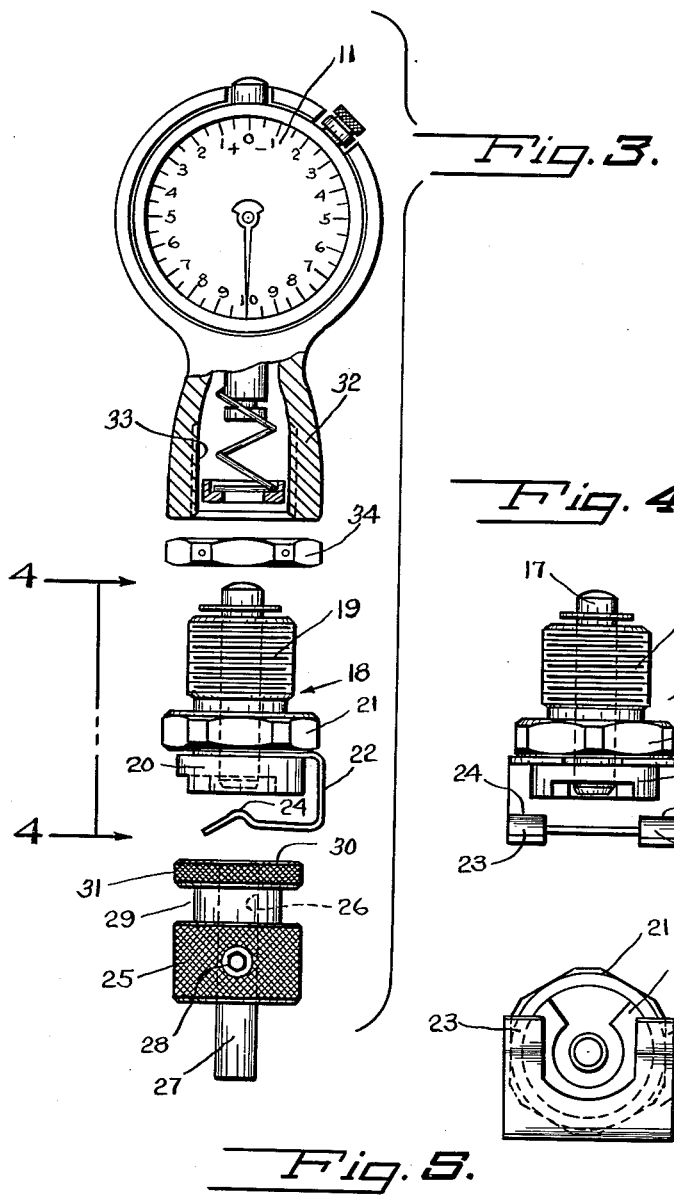
INVENTOR.
WALTER K. DOW
BY
Raymond A. Paquin
ATTORNEY.

United States Patent Office 3,061,934
Patented Nov. 6, 1962

3,061,934
FLUSH PIN GAGE AND ADAPTER THEREFOR
Walter K. Dow, % The Dow Mechanical Corp.,
Thompsonville, Conn.
Filed May 22, 1959, Ser. No. 815,212
8 Claims. (Cl. 33—172)

This invention relates to new and useful improvements in a device for use in gaging or measuring the dimensions of machined, molded or formed parts and has particular reference to a new and improved means whereby the device covered by either of Patents 2,602,235 and 2,642,670 can be rapidly converted into a universal measuring tool for use and in combination with improved flush pin type gages, thereby eliminating the human element in the determination of the accuracy of the part being gaged.

Flush pin gages have long been the most inexpensive type of gaging, therefore, they are generally used for short run production jobs or where the gaging budget is limited. Because of their low cost, flush pins are also often used for dimensions having tolerances much too small for the user's ability to accurately read them. This results in scrapping of parts, continuous argument and great waste of time.

Flush pin gages in general use prior to this invention can be classified in two categories:

(1) The inexpensive and very widely used barrel types consisting of a round barrel or body having a sliding pin therein which is ground to a specific length from the end of said pin to one end of the barrel, while the other end is in direct relation to a tolerance step ground either on the end of the pin or on the barrel.

The relation of the pin end of the tolerance step while the part is being gaged is determined entirely by the human touch or feel, resulting in questionable accuracy. Likewise, it is impossible to determine the exact amount of variation from either end of the tolerance.

Flush pins of this type are generally used for dimensions having a tolerance of no less than .006. Many progressive plants limit their use to tolerances of .010 or more. Others, through false economy, attempt to use them for tolerances as low as .002 but, generally, with costly results. This type is useless for tolerances of less than .002.

(2) The more expensive category and more accurate types of flush pin have a rectangular or large round body having a series of screw holes for bolting it to a dial indicator housing thereby using an indicator to determine the accuracy of the part. This type unit is also divided into two types: (1) A type wherein it is necessary to use a setting master for setting zero on the indicator before use, and (2) a type having a built-in zeroing means that has to be screwed down to the attached flush pin, indicator adjusted to zero, then screwed out of interfering position before gage is ready for use.

One of the objects of my invention is to provide a means whereby the simplest and most inexpensive barrel type flush pin gage can be used for determining dimensional tolerances down to ten-thousandths of an inch.

Another object of my invention is to provide a means in combination with my Patent 2,602,235, whereby simple and inexpensive flush pin type gages can be used for checking parts having tolerances well below that which can be safely checked on flush pins prior to my invention.

Another object of my invention is to provide a means whereby a variety of simple flush pin gages can be quickly and alternately changed in my patented gage No. 2,602,235 without loss of time required in bolting or otherwise screwing them into place.

Another object of my invention is to provide an adapter for my patented gage No. 2,602,235 whereby a series of auxiliary gages can be quickly adapted to it without the necessity of readjustment of the indicator.

Still a further object of my invention is to provide a means whereby inexpensive type flush pin gaging may be used not only for short production runs, but for long runs as well, and for parts having tolerances too small for presently used barrel type gages.

Another object of my invention is to provide a flush pin gage of a type that can be used independent of the indicator for set-up or in machine checking and yet of such a design that it can be quickly snapped on to my patented gage 2,602,235 for an accurate check of the part after it is removed from the machine.

Another object of my invention is to provide a type of barrel flush pin gage that can be readily snapped or fastened in place on an indicator housing adapter without the necessity of screwing it on or otherwise permanently fastening it.

Still another object of my invention is to provide a means whereby the simplest and most inexpensive type barrel flush pin gage can be used for dimensions having tolerances of .0005 or less.

Another object of my invention is to provide a means whereby barrel type flush pin gages can be rapidly adapted to an indicator equipped gage for the elimination of the human element in the determination of the error while gaging the part.

Still another object of my invention is to provide a flush pin gage of the barrel type that can be rapidly, but not permanently, attached to an indicator equipped gage or housing, thus having the quick change feature and versatility of the snap-on socket wrench.

Another object of my invention is to provide a flush pin gage of the barrel type that can be quickly snapped on to an indicator equipped gage for determining the exact relationship between the flush position of the sliding member of the flush pin gage and the position resulting from the gaged dimension on the part being checked.

A further object of my invention is to provide an adapter for quickly adapting a new type flush pin gage to my patented gages Nos. 2,602,235 and 2,642,670 or present modifications of these gages.

Referring to the drawings:

FIG. 1 is a side view, partially in section, of one form of the invention;

FIG. 2 is a front view of the device shown in FIG. 1;

FIG. 3 is an exploded front view, partially in section, showing another form of the invention;

FIG. 4 is a view taken along line 4—4 of FIG. 3;

FIG. 5 is a bottom view of the device shown in FIG. 4;

FIG. 6 is a side view, partially in section, of a portion of an embodiment of the invention; and FIG. 7 is a top view of a portion of the device shown in FIG. 6.

Referring more particularly to the drawings wherein similar reference characters designate corresponding parts throughout, the device shown in FIGS. 1 and 2 comprises a support 10 carrying a dial indicator gage 11 adapted to be actuated by actuating pin 12, which extends into the base 10 and engages one end 13 of pivoted lever 14 which is pivotally mounted at 15 and which has its opposite end 16 engaging an adjacent end of pin 17 of a body or adapter 18, which is shown in FIGS. 3, 4, 5 and 6.

The dial indicator gage and its support is similar to that shown in my Patent No. 2,602,235, except for a flush pin gage adapter as hereinafter described.

The flush pin gage adapter comprises the body indicated generally at 18 and which has a threaded portion 19 adapted to be threaded into a flange 20a in the base 10, or threaded flange 33, FIG. 3, to retain the stage set and adapter in operative position.

The adapter 18 has the head portion 20 and shank 18a (FIG. 6) which is provided with a longitudinal opening or bore 18b in which is positioned the pin 17.

On the adapter 18 is provided the member 21 into which a shank 18a is press-fitted, and a resilient member 22 has a yoke with sides 22a whereby the member may be secured on the adapter 18 by being placed thereover with sides 22a (FIG. 7) in peripheral groove 18c whereby engagement of member 21 will force the sides 22a into engagement with the under side of head portion 20, and member 22 will be locked in position between member 21 and the head portion 20. The resilient member 22 has its oppositely disposed spring fingers 23 with bent portions 24 forming a substantially U-shaped resilient clamping means, as will be seen from FIGS. 4 and 5.

The flush pin gages adapted to be used in the present invention each comprise a body 25 having a longitudinal bore or opening 26 through which extends a flush pin 27, which is adapted to be locked in operative position relative to body 25 by set-screw 28 in the usual manner, whereby the set-screw 28 extends into a slot (not shown) of the flush pin 27 to allow limited longitudinal movement of the flush pin.

The body 25 is provided with a peripheral groove 29 spaced inwardly from the end 30 a sufficient distance to provide an annular flange or shoulder portion 31.

The adapter may be employed with a gage of the type shown in FIG. 1 or with the gage of the type shown in FIG. 3, which is the type of gage generally shown in my Patent 2,642,670, wherein the dial indicator gage 11 is carried by a body member 32 having an internal threaded portion 33 into which the threaded portion 19 of the stage set may be threaded, and a lock nut 34 serves to lock the stage set in adjusted position relative to support 32.

The groove 29 in the adapter 18 of the flush pin gage is adapted to receive the spring fingers 23 and through the deflected portions 24 of said spring fingers retain the end 30 of the flush pin gage in engagement with the adjacent end of the stage set, whereby any movement of the flush pin 27 will be transmitted to dial indicator gage 11 and shown thereby.

With the present invention the body or barrel of the flush pin gage is made with a groove which is received by the adapter and is retained in position by the spring clip, and the deviation or dimensional error on the part is read directly on the dial indicator gage.

It will be seen that with the present invention either of the forms of gages shown equipped with the stage set and adapter, and the dial indicator may be set to zero by using the seating surface of the flush pin barrel, a straight edge or a size block and the indicator is locked and zero is set with the adapter pin flush with the adapter seat and, after this is done, it is only necessary to snap the flush pin in place and the gage is ready for use and, subsequently, a variety of different flush pin gages can be interchanged without readjustment of the gage. Zeroing of the gage is automatically checked each time a flush pin is taken in or out of the adapter.

It will be seen that substantial savings can be made with the present invention by the quick change of flush pins for numerous dimensions on the same part, and the set-up from one part to another requires only the snapping in of a different series of flush pin gages.

From the foregoing it will be seen that I have provided new and improved means for obtaining all of the objects and advantages of the invention.

I claim:

1. In a device of the character described, a support, a dial indicator gage carried by said support, a flush pin gage carried by said support and operatively connected to said dial indicator, and spring clip means for detachably connecting said flush pin gage to said support.

2. In a device of the character described, a support, a dial indicator gage carried by said support, and a flush pin gage carried by said support and operatively connected to said dial indicator gage, and means for detachably connecting said flush pin gage to said support, said means comprising resilient means on said support and a flange on said flush pin gage and adapted to be engaged by said resilient means.

3. In a device of the character described, a support, a dial indicator gage carried by said support, a flush pin gage detachably connected to said support, and means operatively connecting said flush pin gage and said dial indicator gage, and means for detachably connecting said flush pin gage to said support, said means comprising resilient means carried by said support and adapted to engage a flange on said flush pin gage.

4. A flush pin gage adapted to be connected to a support for operative connection to a dial indicator gage carried by said support, said flush pin gage comprising a member having an opening therethrough, and a flush pin in said opening, said member having a peripheral flange forming an annular groove and adapted to be engaged by means on the support for detachably connecting any of a series of the flush pin gages to said support.

5. A flush pin gage adapted to be operatively connected to a dial indicator gage for indicating movements of the flush pin of said flush pin gage, said flush pin gage comprising a gage member having a longitudinal opening, a flush pin in said opening, means on said gage member for connection to a dial indicator support for connecting said flush pin gage to said support, said means comprising resilient means on one of said members and a flange on the other of said members adapted to be engaged by said resilient means.

6. In a device of the character described, a support, a dial indicator carried by said support, a stage set carried by said support and having a pin adapted to actuate said dial indicator and means carried by said stage set and adapted to engage a flush pin gage for retaining said flush pin gage in operative relation with said stage set and dial indicator.

7. In a device of the character described, a support, a dial indicator carried by said support, a stage set carried by said support and having a pin adapted to actuate said dial indicator, means carried by said stage set adapted to engage a flush pin gage, said means retaining said flush pin gage in operative relation with said stage set and dial indicator, said means comprising resilient means adapted to engage a pin flange on said flush pin gage.

8. In a device of the character described, a support, a dial indicator carried by said support, a stage set carried by said support and having a pin adapted to actuate said dial indicator, means carried by said stage set and adapted to engage a flush pin gage for retaining said flush pin gage in operative relation with said stage set and dial indicator, said means comprising a substantially U-shaped resilient means carried by said stage set and adapted to engage a peripheral flange on a flush pin gage.

References Cited in the file of this patent

UNITED STATES PATENTS

| | | |
|---|---|---|
| 2,602,235 | Dow | July 8, 1952 |
| 2,642,670 | Dow | June 23, 1953 |
| 2,667,701 | Davis | Feb. 2, 1954 |